No. 794,450. PATENTED JULY 11, 1905.
H. E. CLAPPER.
NUT LOCK.
APPLICATION FILED JAN. 7, 1905.
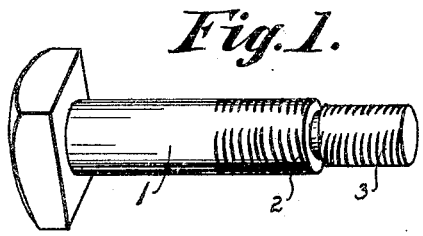
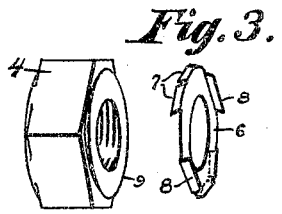
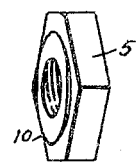
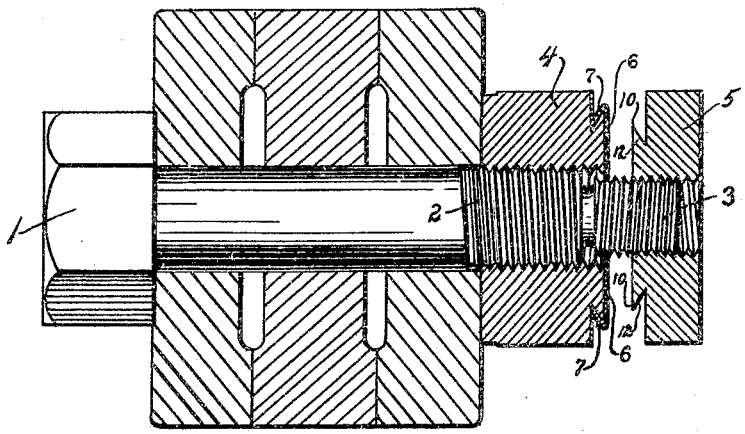
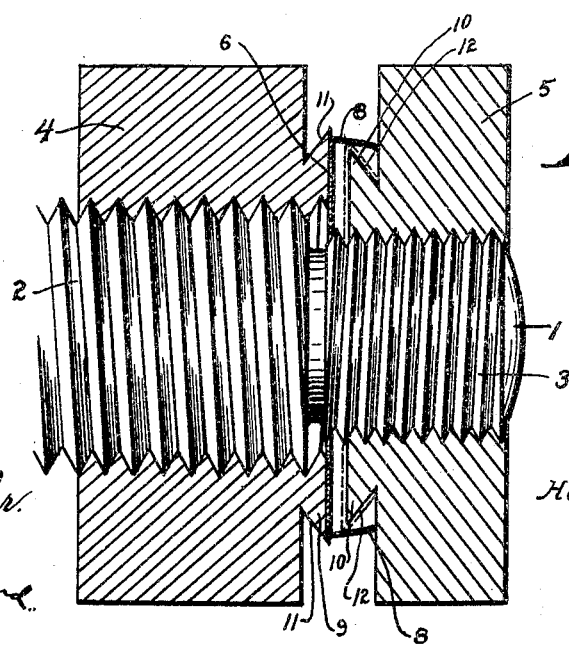
WITNESSES
Jos. J. Hosler.
L. M. Bond.
INVENTOR
Harvey. E. Clapper.
BY
F. W. Bond
ATTORNEY No. 794,450.

Patented July 11, 1905.

UNITED STATES PATENT OFFICE.

HARVEY E. CLAPPER, OF LOUISVILLE, OHIO.

NUT-LOCK.

SPECIFICATION forming part of Letters Patent No. 794,450, dated July 11, 1905.

Application filed January 7, 1905. Serial No. 240,032.

*To all whom it may concern:*

Be it known that I, HARVEY E. CLAPPER, a citizen of the United States, residing at Louisville, in the county of Stark and State of Ohio, have invented certain new and useful Improvements in Nut-Locks; and I do hereby declare that the following is a full, clear, and exact description of the same, reference being had to the annexed drawings, making a part of the annexed specification, in which—

Figure 1 is a detached view of the bolt. Fig. 2 is a detached view of the inner nut. Fig. 3 is a detached view of the lock-disk. Fig. 4 is a detached view of the outer nut. Fig. 5 is a view showing the different parts properly assembled, the lock-disk attached to the inner nut and the outer nut ready to be brought into position to be locked. Fig. 6 is a view showing a portion of the bolt, the nuts in cross-section properly located thereon, the lock-disk located upon the inner nut, and the locking-flanges of the disk in normal position and illustrating their position, when the outer nut is locked, in dotted lines.

Similar numerals of reference indicate corresponding parts in all the figures of the drawings.

In the accompanying drawings, 1 represents the bolt, which may be of any size, reference being had to the purpose for which it is designed. The bolt 1 is provided with the screw-threaded portions 2 and 3, the screw-threaded portion 3 being of less diameter than the screw-threaded portion 2 and said portions being provided with right and left hand threads, respectively. The inner nut 4 is located upon the screw-threaded portion of the larger diameter, and in use the outer face of the nut should extend a short distance beyond the larger screw-threaded diameter when said nut is brought into position to clamp the devices designed to be secured together. The outer nut 5 is located upon the screw-threaded portion 3 and upon the screw-threaded portion having the lesser diameter. Between the nuts 4 and 5 is located the locking-disk 6, which locking-disk is provided with the flanges 7 and 8. Each of the nuts 4 and 5 is provided with the extended annular flanges 9 and 10, which which annular flanges are provided with inclined peripheries 11 and 12, by which arrangement grooves are formed for the reception of the flanges 7 and 8.

In use the locking-disk 6 is placed against the annular flange 9 and the flanges 7 bent down upon the inclined periphery 11, as illustrated in Fig. 5, after which the outer nut 5 is turned in the direction to move said nut toward the inner nut 4, and as the nut 5 approaches the locking-disk 6 the outer edges of the locking-flanges 8 will come in contact with the inner face of the nut 5, and as the nut 5 is moved snugly against the disk 6 the flanges 8 will be bent down upon the incline 12, thereby locking the two nuts 4 and 5 together in such a manner that they cannot be jarred apart, so as to loosen the nuts upon the bolt 1. When it is desired to remove the outer nut, a heavy wrench can be applied and force sufficient to straighten the flanges 8 sufficiently to allow the nut 5 to move away from the locking-disk 6.

It will be understood that as the nut 5 moves away from the locking-disk 6 the flanges 8 will be straightened by reason of the extreme outer edge of the annular flange 10 pressing against the faces of the flanges 8.

In use the nut 4 when properly clamped should extend a short distance beyond the screw-threaded portion 2, so that the nut 5 can be properly locked in case of any change as to thickness between the head of the nut 1 and the inner face of the nut 4.

Having fully described my invention, what I claim as new, and desire to secure by Letters Patent, is—

In a nut-lock, the combination of a bolt having screw-threaded portions of different diameters, and right and left hand screw-threads respectively, nuts adapted to be located upon the right and left screw-threaded portions of the bolt, said nuts provided with annular flanges having inclined peripheries inclined toward the faces of the nuts, a locking-disk interposed between the nuts and provided with flanges located upon opposite sides of the locking-disk, said flanges adapted to be bent upon the inclined peripheries of the annular flanges of the nuts, and over the extreme peripheries of the annular flanges, substantially as and for the purpose specified.

In testimony that I claim the above I have hereunto subscribed my name in the presence of two witnesses.

HARVEY E. CLAPPER.

Witnesses:
J. A. JEFFERS,
F. W. BOND.